(12) United States Patent
Todoroki et al.

(10) Patent No.: US 7,797,515 B2
(45) Date of Patent: Sep. 14, 2010

(54) SYSTEM AND METHOD FOR LIMITING THE NUMBER OF UNIT PROCESSORS FOR WHICH SUSPENSION OF PROCESSING IS PROHIBITED

(75) Inventors: Akinari Todoroki, Okaya (JP); Katsuya Tanaka, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 299 days.

(21) Appl. No.: 11/656,545

(22) Filed: Jan. 23, 2007

(65) Prior Publication Data

US 2007/0180163 A1 Aug. 2, 2007

(30) Foreign Application Priority Data

Jan. 31, 2006 (JP) ............................. 2006-022192

(51) Int. Cl.
G06F 9/00 (2006.01)
(52) U.S. Cl. ...................................... 712/220; 712/244
(58) Field of Classification Search .................. 712/43, 712/203, 220, 228, 229, 244; 718/103, 108; 719/318
See application file for complete search history.

(56) References Cited

U.S. PATENT DOCUMENTS 6,629,180 B1 9/2003 Attimont et al.
6,754,576 B2 * 6/2004 Nishimura .................. 701/102
2005/0102458 A1 * 5/2005 Ober et al. .................. 710/260

FOREIGN PATENT DOCUMENTS

| JP | A-62-210545 | 9/1987 |
| JP | A 03-171249 | 7/1991 |
| JP | A 05-324569 | 12/1993 |
| JP | A 07-200496 | 8/1995 |
| JP | A 8-297581 | 11/1996 |
| JP | A 2006-285718 | 10/2006 |

OTHER PUBLICATIONS

Takada, "μITRON 4.0 Specification, Ver. 4.00.00", 2002, 372 pages.*
Takada H. et al., "Real-time Operating System for Function Distributed Multiprocessors," IPSJ Magazine, vol. 47, No. 1, Jan. 15, 2006, pp. 41-47.
Takada H., "Real-Time Kernel Specification for Functionally Distributed Multiprocessor," (online) May 27, 2005, TOPPERS Project. Internet <URL:http://toppers.jp/docs/tech/fdmp-spec1-9.pdf>.
European Search report, issued Dec. 3, 2009 in European Patent Application No. 07707636.2. , 6 pages.

* cited by examiner

Primary Examiner—David J Huisman
(74) Attorney, Agent, or Firm—Oliff & Berridge, PLC

(57) ABSTRACT

A multi-processor system includes a plurality of unit processors that operate in parallel. The system includes a suspension prohibition section for, in response to a request from at least one of the unit processors, prohibiting suspension of processing only in the requesting unit processors for which prohibiting suspension has been requested. The suspension prohibition section limits the number of unit processors for which the suspension is prohibited at the same time to a certain limited number or below.

6 Claims, 6 Drawing Sheets

SYSTEM AND METHOD FOR LIMITING THE NUMBER OF UNIT PROCESSORS FOR WHICH SUSPENSION OF PROCESSING IS PROHIBITED

The entire disclosure of Japanese Patent Application No. 2006-022192, filed Jan. 31, 2006 is expressly incorporated by reference herein.

BACKGROUND

1. Technical Field

The present invention relates to a multi-processor system and a program for causing a computer to execute a controlling method of the multi-processor system, and more specifically to a multi-processor system that improves efficiency by using a plurality of processors and a program for causing a computer to execute a controlling method of the multi-processor system.

2. Related Art

The processor used for a specific device is called a built-in system. Recently, it has been shown that a multi-processor or a multi-thread processor may be used for a built-in system. Such a multi-processor is advantageously used to make the device have a low clock rate or improve the responsiveness of the device. In particular, it is desirable to use a multi-processor in a portable device because the multi-processor is also advantageous in reducing power consumption.

The determination of whether a newly developed processor operates normally or not takes time and has costs. For that reason, in the field of software, if a processor with good performance can be diverted, it is desirably diverted. When the built-in system is used as a multi-processor, it is requested to divert software of a previously used single processor.

A conventional technique for diverting a single processor for a multi-processor is described in JP-A-8-297581 (hereinafter referred to as patent document 1). The invention of the patent document 1 is for transporting an OS (Operating System) for a single processor based on µITRON (registered trademark) to a multi-processor.

A processor may call an OS function that is called as a service call. With the service call, an interruption for a processor or a task switch in the processor can be controlled. The name of a service call is used in µITRON (registered trademark) and may be called as a system call.

However, a multi-processor system cannot be adequately utilized if a system call used in a single processor is diverted in a multi-processor system.

Obviously, the service call (dis_dsp) that prohibits a task switch of a single processor does not assume that tasks operate in parallel. As such, if a task switch is requested and dis_dsp prohibits a task switch, the task switch does not occur until the prior task completes.

The service call (loc_cpu) prohibits an interruption of a single processor and occupies only a single processor. If an interruption is requested and loc_cpu prohibits an interruption, an interruption is never executed until the prior processing completes.

When the above-mentioned service calls, dis_dsp or loc_cpu, are applied, the multi-processor system, which enables parallel operation, cannot fully utilize the resources of the system because the parallel operation is prevented.

The present invention is adapted in view of the above problems and intends to provide a multi-processor system that can smoothly perform parallel processing in the multi-processor system and provide high efficiency by effectively utilizing the resources and providing a controlling method of the multi-processor system.

SUMMARY

In order to solve the above-mentioned problem, the multi-processor system of the present invention is a multi-processor system with a plurality of unit processors in which the unit processors can operate in parallel, characterized by including a suspension prohibition section for, in response to a request from at least one of the unit processors, prohibiting suspension that suspends, only in the requesting unit processor, processing executed in the unit processor.

According to the invention, only in the requesting unit processor among a plurality of unit processors, suspension of the processing executed in the unit processor can be prohibited. As such, processing with high priority can be designated as a top priority, while other processors can accept an interruption.

The present invention can provide a multi-processor system that can smoothly perform parallel processing in the multi-processor system and provide high efficiency by effectively utilizing the resources.

The multi-processor system of the present invention is characterized in that the suspension prohibition section prohibits an external interruption, a processor interruption and a task switch for a unit processor.

With the invention, suspension of a task and an interruption in a unit processor can be effectively prevented.

The multi-processor system of the present invention is characterized in that the suspension prohibition section prohibits suspension in an occupied section which is defined in a program based on processing executed by the unit processor while the processing is prohibited.

According to the invention, suspension of desired processing can be certainly prevented so that parallel processing can be smoothly executed without regard for a time taken for the processing.

The multi-processor system of the present invention is characterized in that the suspension prohibition section limits the number of unit processors for which the suspension is prohibited at the same time to a certain limited number or below.

According to the invention, efficiency can be prevented from being lowered while necessary processing can be executed.

The multi-processor system of the present invention is characterized in that, when the number of requesting unit processors that requests to prohibit suspension exceeds the limited number, the suspension prohibition section causes a later request to prohibit suspension to wait until the number of the requesting unit processors get below the limited number.

According to the invention, processing for which suspension prohibition is highly needed can be preferentially set in a suspension prohibition state.

The multi-processor system of the present invention is characterized in that, when the number of requesting unit processors that request to prohibit suspension exceeds the limited number, the suspension prohibition section notifies the unit processor that requested to prohibit suspension later that the requesting unit processors exceed the limited number.

According to the invention, later processing of the unit processor, that cannot enter a state of prohibiting suspension, can be performed by the unit processor. For this reason, a load of OS processing can be alleviated and the degree of freedom of processing of the unit processor can be improved.

The multi-processor system of the embodiment is characterized by including a suspension prohibition releasing section for, in response to a request from a unit processor for which suspension is prohibited by the suspension prohibition section, releasing prohibition of suspension for the requesting unit processor.

According to the invention, suspension prohibition can be released only for the requesting unit processor among the unit processors for which suspension is prohibited. For this reason, a section in which suspension is certainly prohibited at the unit processor can be allocated.

The program for causing a computer to execute a controlling method of the multi-processor system of the present invention is a program for causing a computer to execute a controlling method of the multi-processor system applied to a multi-processor system with a plurality of unit processors in which the unit processors can operate in parallel, characterized by including a suspension prohibiting step of, in response to a request from at least one of the unit processors, prohibiting suspension that suspends, only in the requesting unit processor, processing executed in the unit processor.

According to the invention, only in the requesting unit processor among a plurality of unit processors, suspension of processing that is executed in the unit processor can be prohibited. As such, processing with high priority can be designated as a top priority, while other processors can accept an interruption.

Therefore, the present invention can provide a program for causing a computer to execute a controlling method of a multi-processor system that can smoothly perform parallel processing in the multi-processor system and provide high efficiency by effectively utilizing resources.

DETAILED DESCRIPTION OF THE PREFERRED EMBODIMENTS

An embodiment of the multi-processor system and a program for causing a computer to execute a controlling method of the multi-processor system according to the present invention will be described with reference to the drawings below.

Figure 1A:
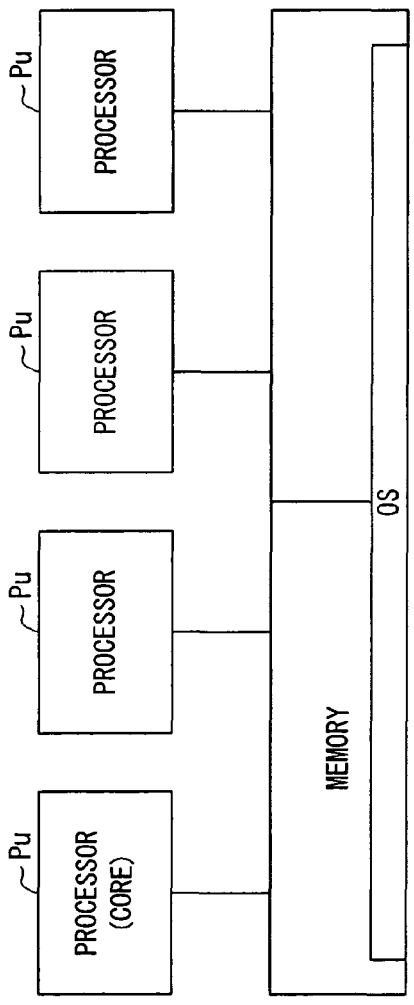
FIGS. 1A and 1B are diagrams showing examples of combing unit processors in a general multi-processor system.
Figure 1B:
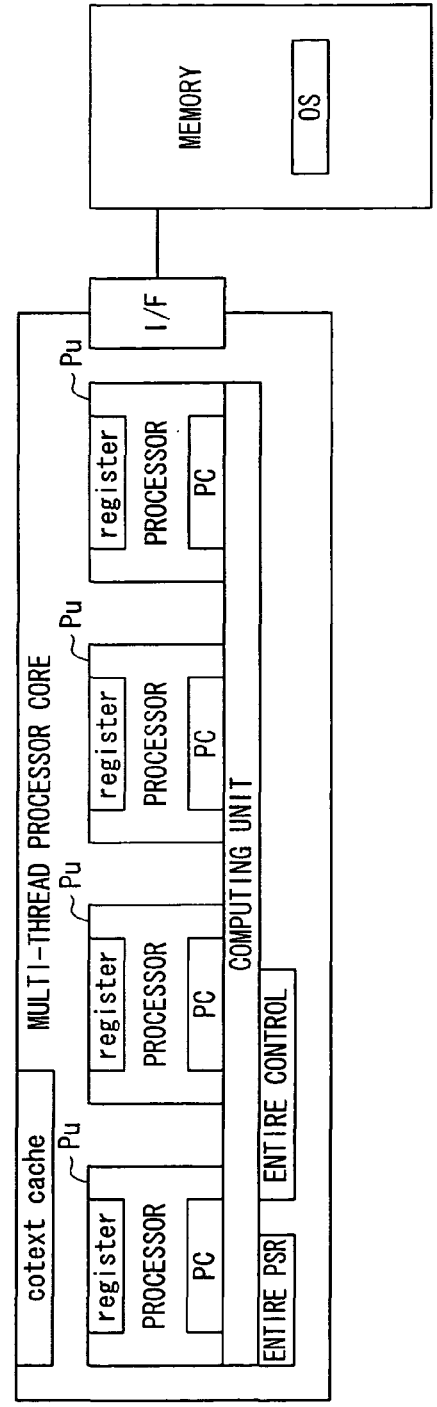

The embodiment is the multi-processor system of the embodiment as a built-in system applied to a cellular phone. The multi-processor system is formed with a plurality of processors (unit processors) coupled with each other. FIGS. 1A and 1B show examples of combining unit processors in a general multi-processor system.

Each of the multi-processors shown in FIGS. 1A and 1B is a configuration called a symmetric multi-processor (SMP) in which a plurality of unit processors Pu are coupled so as to share a memory. The configuration shown in FIG. 1A is called a multi-processor, while the configuration shown in FIG. 1B is called a multi-thread processor. In the multi-thread processor, unit processors Pu are combined more closely with each other than in the multi-processor in that a computing unit is shared.

In the embodiment, an example where a multi-processor system is adapted as a multi-processor will be described. The embodiment can be adapted as any of a multi-processor or a multi-thread processor.

Figure 2:
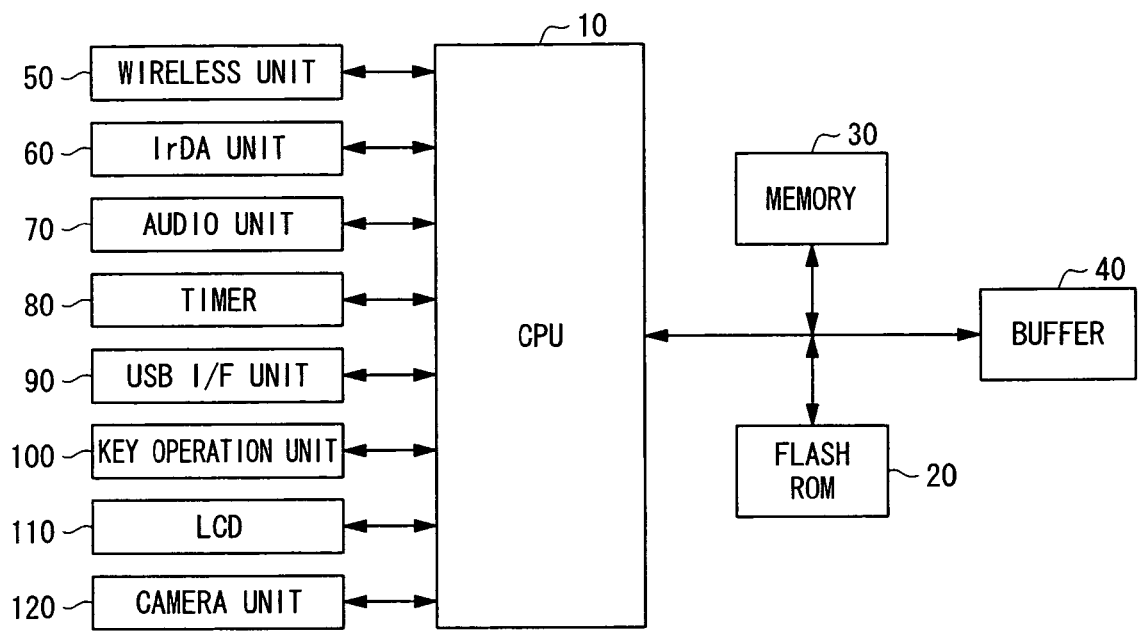
FIG. 2 is a block diagram showing a functional configuration of a cellular phone to which a multi-processor system of an embodiment of the present invention is applied.

FIG. 2 is a block diagram showing a functional configuration of a cellular phone which has a multi-processor system applied according to an embodiment of the present invention. In FIG. 2, the cellular phone includes a CPU (Central Processing Unit) 10, a flash ROM 20, a memory 30, a buffer 40, a wireless unit 50, an IrDA (Infrared Data Association) unit 60, an audio unit 70, a timer 80, a USB (Universal Serial Bus) interface unit 90, a key operation unit 100, a LCD (Liquid Crystal Display) 110, and a camera unit 120 with the CPU 10, the flash ROM 20, the memory 30 and the buffer 40 connected via a bus. The wireless unit 50, the IrDA unit 60, the audio unit 70, the timer 80, the USB interface unit 90, the key operation unit 100, the LCD 110 and the camera unit 120 are directly connected with the CPU 10.

CPU 10 controls the cellular phone by processing a plurality of tasks in parallel. In response to various indicating signals inputted from the key operation unit 100, the CPU 10 reads and executes an operating system (OS) program or various application programs stored in the memory 30, and executes an interruption handler according to interruption signals inputted from peripheral chips such as the wireless unit 50, the audio unit 70 or the camera unit 120. The OS corresponds to the multi-processor. The OS is kept in the memory 30 common to unit processors included in the multi-processor. The CPU 10 stores various results of processing in the flash ROM 20 or the memory 30.

Figure 3:
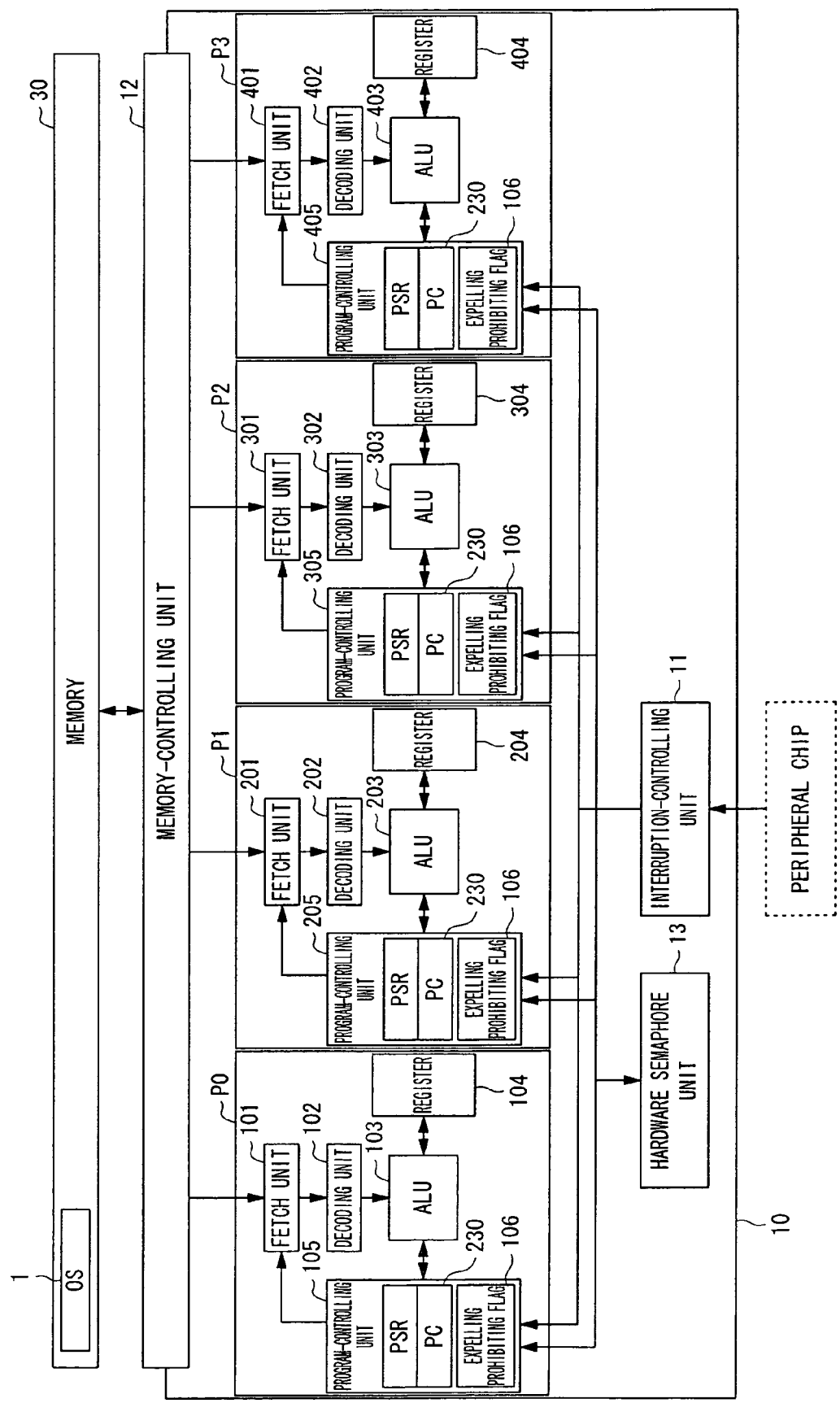
FIG. 3 is a diagram illustrating a multi-processor of the embodiment of the present invention shown in FIG. 2 as the CPU 10.

FIG. 3 is a diagram illustrating a multi-processor of the embodiment shown in FIG. 2 as the CPU 10. The multi-processor of the embodiment combines a plurality of unit processors P0, P1, P2, and P3 to operate the unit processors in a single operating system in parallel. As shown in FIG. 3, the multi-processor includes a plurality of unit processors P0 to P3, an interruption-controlling unit 11, the memory-controlling unit 12, and a hardware semaphore (hereinafter HW semaphore) unit 13.

The multi-processor has the memory 30 common to the unit processors P0 to P3, with the memory 30 keeping the OS 1. The OS 1 controls the multi-processor, and is read in response to a service call or the like, and sets a state of a unit processor according to the kind of the service call.

The HW semaphore 13 is adapted to add a semaphore (in the embodiment, described as an HW semaphore) that is a right for being processed by an OS to any of the unit processors. When an external interruption signal is inputted from a peripheral chip such as the wireless unit 50 or the like, the interruption-controlling unit 11 arbitrates the interruption signal and outputs a predetermined interruption signal to a specified unit processor among the unit processors P0 to P3. The memory-controlling unit 12 is provided between the CPU 10 and the memory 30. When data is read or written from the CPU 10 to the memory 30, the memory-controlling unit 12 inputs/outputs data by controlling the memory 30. The memory-controlling unit 12 is adapted to control the memory 30 that is a shared area for the unit processors P0 to P3.

An inner configuration of each of the unit processors P0 to P3 will be described. The unit processors P0 to P3 have the same configuration. Thus, only an inner configuration of the unit processor P0 will be described to omit description of the other unit processors.

The unit processor P0 includes a fetch unit 101, a decoding unit 102, an ALU (Arithmetic and Logical Unit) 103, a register file 104 and a program-controlling unit 105. The fetch unit 101 reads an instruction code from a memory address indicated by a program counter of the program-controlling unit 105 (described later) and outputs the instruction code to the decoding unit 102.

The decoding unit 102 decodes the instruction code inputted by the fetch unit 101 and outputs the decoded result (an instruction content, addresses of a source register, a destination register and the like) to the ALU 103.

The ALU 103 performs a predetermined computation according to the decoded result inputted by the decoding unit 102, writes the computation result into the register file 104 or outputs an address of the destination of the branch that is a computation result of a branching instruction or the like to the program-controlling unit 105.

The register file 104 is a group of registers that stores data read from the memory 30 in response to a loading instruction or data that is a computation result of the ALU 103. As to be described later, the register file 103 includes a group of general registers and a group of special registers. The group of special registers is an area, in which an address for boot processing of the embodiment is written.

The program-controlling unit 105 controls the unit processor P0 and includes a status register (PSR) that stores a status of the unit processor P0 (for example, whether an interruption can be executed or not, whether overflow occurs in the unit processor P0 or not) and a program counter (PC) 230 that keeps a memory address in which an instruction to be executed by the unit processor P0 is stored next. The program-controlling unit 105 changes the value of the PSR to an interruption disabled when the unit processor P0 transfers to an interruption or changes the value of the program counter to an address of the branch destination when a branch instruction is executed.

The program-controlling unit 105 has an expelling prohibiting flag 106. The expelling prohibiting flag 106 is a mechanism for prohibiting currently executed processing to be expelled from the unit processor in response to occurrence of a task switch or external interruption in the self-unit processing.

The unit processor executes processing of a task or an interruption managed by the task (processor interruption) and an external interruption of a non-task. The OS 1 prohibits a task or an interruption, currently in a unit processor, from being switched to another task or another interruption by setting the expelling prohibiting flag 106 of each unit processor to 1. The state where task expelling is prohibited in a unit processor is called a lock state.

The program-controlling unit 105 of the embodiment is adapted to issue a service call and call the OS 1. In the embodiment, at least some of the unit processors P0 to P3 issue a service call by the program-controlling unit 105. The OS 1 is called by the service call. The called OS 1 prohibits the interruption that suspends processing executed in the unit processor only for the unit processor that called the OS 1. The OS 1 makes a suspension prohibiting section of the embodiment.

In the embodiment, a service call for requesting a suspension prohibition to the OS 1 is described as ocp_cpu. In response to the request by the unit processor for which suspension is prohibited by ocp_cpu, suspension prohibition is released only for the unit processor for which a request is issued. The service call for requesting to release suspension prohibition to the OS 1 is described as unl_ocp.

Next, ocp_cpu, unl_ocp will be detailed.

(ocp_cpu)

"ocp_cpu" is a service call for prohibiting the next processing task issued in the unit processor from being issued as a suspension. The state of the unit processor for which suspension is prohibited is also described as ocp_cpu hereinafter.

The external interruption is an interruption requested by the camera unit 120 or the key operating unit 100 shown in FIGS. 1A and 1B. The processor interruption is an interruption that occurs inside the multi-processor in accordance with priority of a task. The task switch inside the processor means switching of a task being executed in the unit processor no matter what the cause is. In the specification, a task is a unit of programs to be executed by an event occurring in the multi-processor.

"ocp_cpu" is a service call defined for processing a task preferentially in a unit processor and set with an intention of causing a task to maintain the RUN state. As such, ocp_cpu prohibits suspension only in the unit processor that issued a service call of ocp_cpu without any effect on another unit processor.

"ocp_cpu" state is effective until the unit processor in an ocp_cpu state issues unl_ocp. The section from ocp_cpu to unl_ocp is defined on a program with reference to processing executed by the unit processor that issued ocp_cpu, while suspension is prohibited.

In the embodiment, suspension can be certainly prohibited until processing that should not be suspended ends, regardless of time required for processing. The embodiment enables a programmer to arbitrarily set a section from ocp_cpu to unl_ocp and arbitrarily set an occupied section of a unit processor.

In the embodiment, because ocp_cpu, unl_ocp are defined as a service call, a user program can be freely used.

In the embodiment, the program-controlling unit 105 and the OS 1 limit the number of unit processors for which suspension is prohibited at the same time by ocp_cpu to a certain number (within the limited number). A programmer specifies the limited number as an initial parameter. In the embodiment, a synchronizing-type service call and a polling-type service call are defined to address the unit processor that issued ocp_cpu at a timing when the number of CPUs in the ocp_cpu state has reached the limited number.

When the number of unit processors that request to prohibit suspension (requesting unit processor) exceeds the limited number, the synchronizing-type service call causes a later request to prohibit suspension to wait until the number of the requesting unit processors gets below the limited number.

When the number of requesting unit processors that request to prohibit suspension exceeds the limited number, the polling-type service call notifies the unit processor that requested to prohibit suspension that the requesting unit processor exceeds the limited number.

Figure 4:
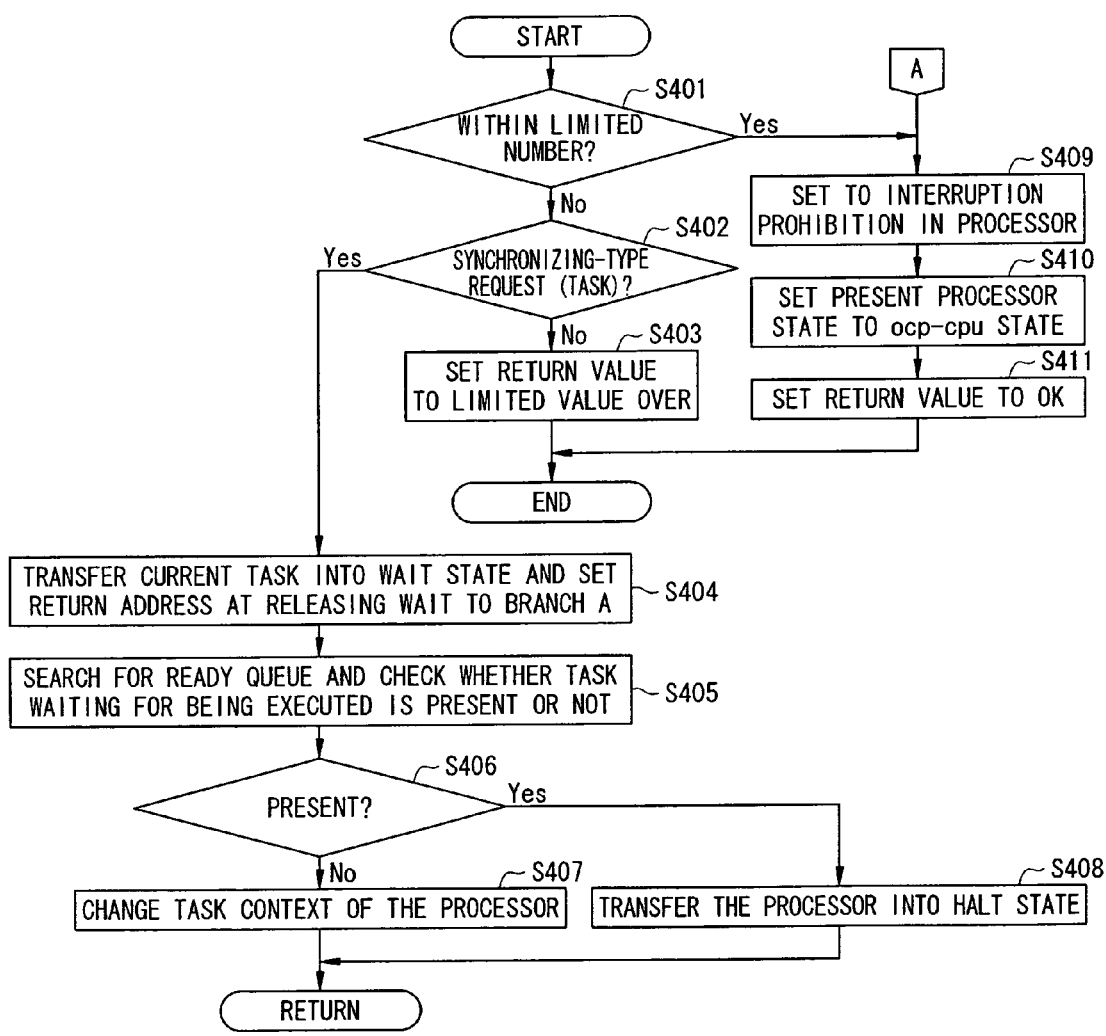
FIG. 4 is a flowchart illustrating a program executed in response to ocp_cpu issued of an embodiment of the present invention.

FIG. 4 is a flowchart illustrating a program for causing a computer to execute a controlling method of a multi-processor system executed by the OS 1 in response to ocp_cpu issued.

The OS 1 called in response to ocp_cpu issued by the program-controlling unit 105 first determines whether the number of unit processors currently in ocp_cpu state is within the limited number or not (S401). If the number is within the limited number as a result of the determination (S401: Yes), the unit processor that issued ocp_cpu is set to prohibit all interruption in the processor (set an expelling prohibition flag) (S409).

Next, the OS 1 sets the unit processor that issued ocp_cpu to the ocp_cpu state, and notifies the program-controlling unit 105 that ocp_cpu state is allocated by setting OK to a return value (S411).

If the OS 1 determines that the unit processor in the ocp_cpu state exceeds the limited value at the step S401 (S401: No), it determines whether the unit processor that issued ocp_cpu has issued the synchronizing-type service call or not (S402). If the service call issued by the unit processor is the synchronizing-type service call and also requested by a task (S402: Yes), the unit processor is transferred into a WAIT state in the service call. The OS 1 sets the destination of branch to a branch A shown in the figure when the WAIT state is released (S404). The unit processor can immediately enter in the ocp_cpu state at the step S404 when the WAIT state is released.

After the OS 1 puts the unit processor into the WAIT state, it searches READY queue and determines whether a task waiting for execution is present or not (S405). If the task is present (S406: Yes), the OS 1 transfers the unit processor into the HALT state (S408) to enable the task to be executed. If the task waiting for being executed is not present (S406: No), the OS 1 changes a task context of the unit processor (S407).

If it is determined that a unit processor does not issue the synchronizing-type service call at the step S402 (S402: No), the OS 1 notifies that the number of requesting unit processors exceeds the limited number by returning the return value to the program-controlling unit 105 in the embodiment (S403). The following processing is decided by the program-controlling unit 105. In such a case, the program-controlling unit 105 may issue the polling-type service call. If it is detected that a requesting unit processor is in the limited value or below by the polling, the unit processor can be transferred into the ocp_cpu state.

(unl_ocp)

"unl_ocp" is a service call that is issued by a user program of a processor in the ocp_cpu state. The unit processor recovers from the ocp_cpu state by issuing the unl_cpu. If unl_ocp is issued when the requesting unit processor is equal to or more than the limited number, the unit processor that first issued ocp_cpu among the unit processors waiting to enter into the ocp_cpu state enters into the ocp_cpu state.

With such processing, the embodiment can always keep the number of unit processors in the ocp_cpu state to the limited number or below. Thus, the embodiment can absolutely execute the processing that should not be suspended, while preventing the efficiency of the entire multi-processor from degrading as many of the unit processors do not accept any interruption.

Figure 5:
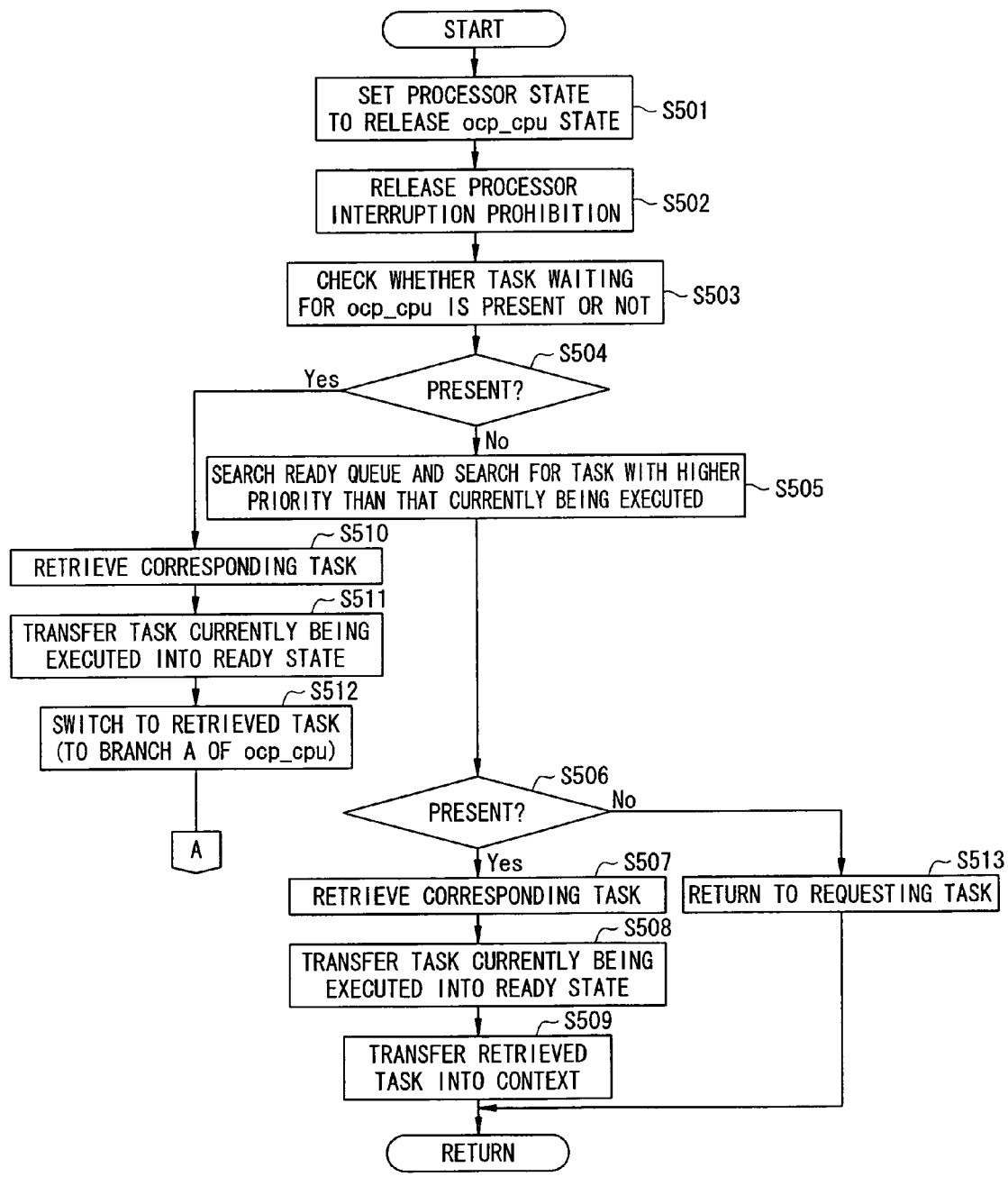
FIG. 5 is a flowchart illustrating a program executed in response to unl_ocp issued of an embodiment of the present invention.
Figure 6:
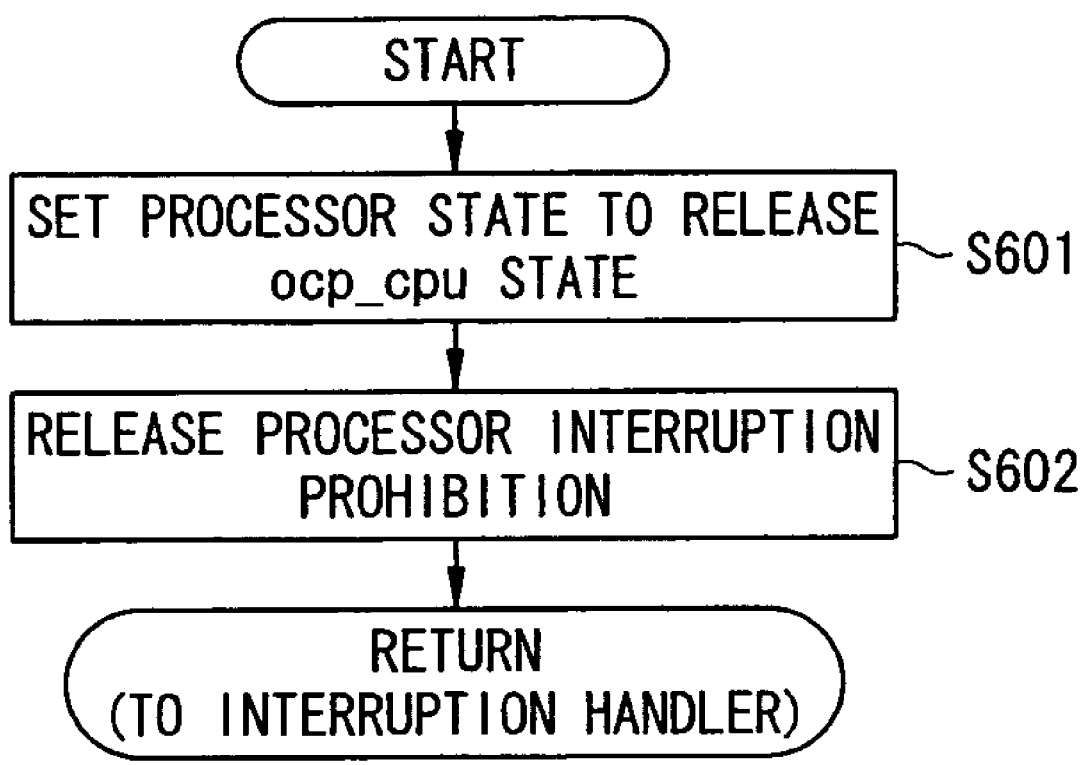
FIG. 6 is another flowchart illustrating a program executed in response to unl_ocp issued of an embodiment of the present invention.

FIGS. 5 and 6 are programs for causing a computer to execute a controlling method of a multi-processor system that is executed by the OS 1 in response to issuing of unl_ocp. The flowchart of FIG. 5 shows an operation of the OS 1 where unl_ocp is issued in response to a request of a task. The flowchart of FIG. 6 shows an operation of the OS 1 where unl_ocp is issued in response to a request of an interruption handler.

The OS 1 called by unl_ocp issued in response to the request of a task releases the ocp_cpu state of the unit processor that issued ocp_cpu as shown in FIG. 5 (S501). Then, the OS 1 releases a processor interruption prohibition for a unit processor (S502) and checks whether there is a task waiting to enter in the ocp_cpu state or not (S503).

If there is such a task as a result of the checking (S504: Yes), the OS 1 detects a task corresponding to that (S510). The OS 1 transfers the retrieved task into READY state (S511), and switches the detected task into the ocp_cpu state (S512).

If it is determined that there is no task waiting to enter the ocp_cpu state at the step S504 (S504: No), the OS 1 searches READY queue and determines whether there is a task with priority higher than that currently executed in the multi-processor (S505). If there is a task with higher priority (S506: Yes), the OS 1 detects the task and transfers the task currently executed into READY state (S508). Then, the OS 1 switches the recovered unit processor to a context of the detected task (S509).

As shown in FIG. 6, the OS 1 called by unl_ocp issued in response to a request from an interruption handler releases the ocp_cpu state of the unit processor that issued ocp_cpu (S601). Then, the OS 1 releases the processor interruption prohibition for the unit processor (S602), and returns into a state before unl_ocp is issued. The subsequent processing in the unit processor is controlled by the interruption handler.

The number of "unl_ocp" issued by the interruption handler is limited such that the number of unit processors that enter in the unl_ocp state at the same time does not exceed a predetermined number. If the predetermined number or more unl_ocp calls are issued, the program-controlling unit 105 cannot accept unl_ocp issued thereafter as an error.

The program for causing a computer to execute a controlling method of the multi-processor system of the embodiments described in FIGS. 4, 5 and 6 is provided on a computer readable recording medium such as a CD-ROM, a floppy (registered trademark) disk (FD), DVD or the like in a file of a installable form or a executable form. The program for causing a computer to execute a controlling method of the multi-processor system of the embodiment may be adapted to be provided as stored in a computer connected to a network such as the Internet and being downloaded over the network.

The program for causing a computer to execute a controlling method of the multi-processor system of the abovementioned embodiment may be provided by being recorded on a memory device such as a computer readable ROM, a flash memory, a memory card, a USB connected flash memory or the like. As mentioned above, the embodiment can prohibit suspension of the processing executed in a unit processor only in the requesting unit processor among the plurality of processors P0 to P3 included in the multi-processor. As such, the processor can certainly process processing with the highest priority at the top priority, while another processor can accept an interruption. As such, the present invention can smoothly perform parallel processing in the multi-processor system to effectively utilize resources of the multi-processor. Thus, the present invention can provide a multi-processor which provides high efficiency and a program for causing a computer to execute a controlling method of the multi-processor.

What is claimed is:

1. A multi-processor system, comprising:
    a plurality of unit processors that operate in parallel, and
    a suspension prohibition section for, in response to a request from at least one of the unit processors, prohibiting suspension of processing only in requesting unit processors for which prohibiting suspension has been requested,
    wherein the suspension prohibition section limits the number of unit processors for which the suspension is prohibited at the same time to a certain limited number or below.

2. The multi-processor system according to claim 1, wherein the suspension prohibition section prohibits an external interruption, a processor interruption and a task switch for a unit processor.

3. The multi-processor system according to claim 1, wherein when the number of the requesting unit processors that request prohibiting suspension exceeds the limited number, the suspension prohibition section causes a later request to prohibit suspension to wait until the number of the requesting unit processors gets below the limited number.

4. The multi-processor system according to claim 1, wherein when the number of the requesting unit processors that request to prohibit suspension exceeds the limited number, the suspension prohibition section notifies unit processors that later request to prohibit suspension that the number of the requesting unit processors that have requested to prohibit suspension exceeds the limited number.

5. The multi-processor system according to claim 1, comprising a suspension prohibition releasing section for, in response to a request from a unit processor for which suspension is prohibited by the suspension prohibition section, releasing prohibition of suspension only for the requesting unit processor for which suspension has been prohibited.

6. A non-transitory computer-readable recording medium for recording a program for causing a computer to execute a controlling method of a multi-processor system with a plurality of unit processors in which the unit processors can operate in parallel, the method comprising:

a suspension prohibiting step of, in response to a request from at least one of the unit processors, prohibiting suspension of processing only in requesting unit processors for which prohibiting suspension has been requested, wherein the suspension prohibition section limits the number of unit processors for which the suspension is prohibited at the same time to a certain limited number or below.

* * * * *